Figure 1:
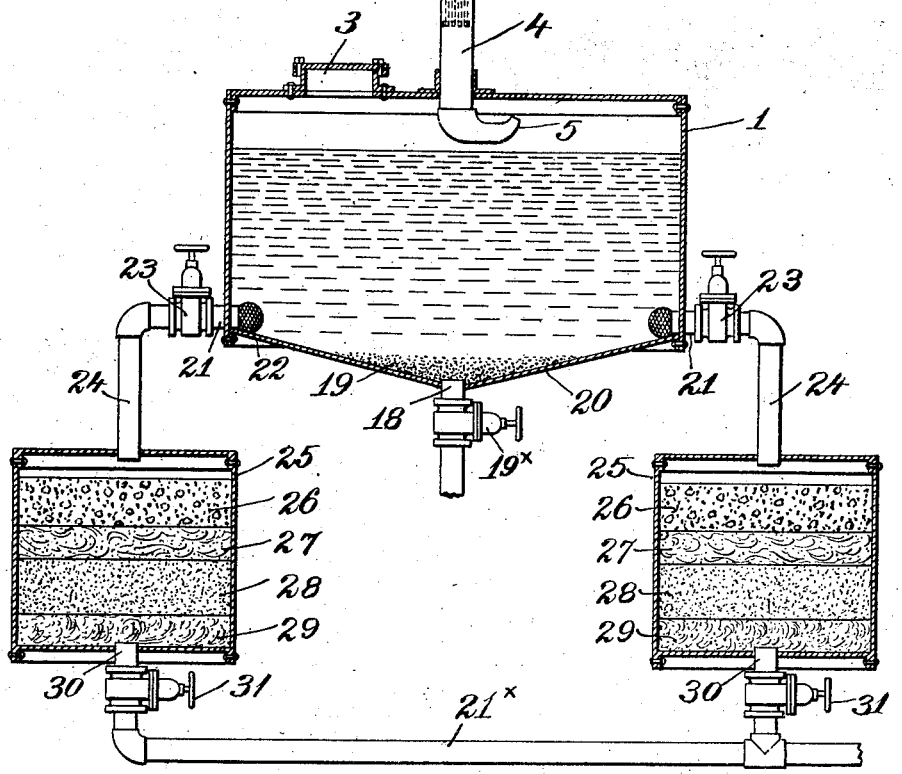

No. 840,335. PATENTED JAN. 1, 1907.
J. A. HYLE.
ELECTRIC WATER PURIFYING AND FILTERING APPARATUS.
APPLICATION FILED APR. 3, 1906.

Witnesses:
May M. Flynn
Albert Hopkins

Inventor.
Jacob A. Hyle
by Jas. L. Skidmore
Attorney.

UNITED STATES PATENT OFFICE.

JACOB A. HYLE, OF ALTOONA, PENNSYLVANIA, ASSIGNOR, BY DIRECT AND MESNE ASSIGNMENTS, OF ONE - HALF TO FREDERICK HESSER AND ONE-FOURTH TO D. A. REAGAN, OF ALTOONA, PENNSYLVANIA.

ELECTRIC WATER PURIFYING AND FILTERING APPARATUS.

No. 840,335.      Specification of Letters Patent.      Patented Jan. 1, 1907.

Application filed April 3, 1906. Serial No. 309,678.

*To all whom it may concern:*

Be it known that I, JACOB A. HYLE, a citizen of the United States, residing at Altoona, in the county of Blair and State of Pennsylvania, have invented certain new and useful Improvements in Electric Water Purifying and Filtering Apparatus, of which the following is a specification.

This invention relates to electric water purifying and filtering apparatus; and one of the principal objects of the same is to provide a large reservoir for receiving the water from any suitable source of supply—like a lake, river, street water-main, or other body of water—and to provide an inlet-pipe from said source of supply to the reservoir with a contracted inner end and at a point immediately above the end with electrical means for treating the water that enters the reservoir with a strong electric current to destroy the germs.

Another object is to provide a reservoir for receiving water from a source of supply and having a contracted inlet end to the intake-pipe to retard the water flowing into the reservoir in order that said water may be thoroughly electrified to destroy the germs and receive all precipitates and foreign deposits in the concave bottom of the reservoir in order that they may be withdrawn at times from the reservoir by means of a cleaning-pipe located in the lowest point in the reservoir-bottom.

Another object is to provide means in an apparatus of the character described for leading the purified water from the reservoir after it has been thoroughly electrified into and through a filter or a series of filters to a supply-pipe led to a point for use by hotels, apartment-houses, families, or other purposes.

Another object of my invention is to provide an apparatus to be used in a water-supply system for cities or large plants in which the water is first thoroughly electrified to destroy the germs and to deposit the foreign matter therein at the bottom of a reservoir and to conduct the water from the reservoir through screen-pipes to a filter or series of filters to the purified-water-supply pipe, said filters comprising layers of coarse sand, coarse mineral wool, fine sand, and fine mineral wool.

In carrying out my invention I provide an inlet-pipe leading to the reservoir with an electrolytic cell which extends throughout the entire cross-sectional area of the pipe in order that the water which passes the battery will be thoroughly electrified, and in order to assist in the complete purification of the water passing through said battery the discharge end of said pipe is contracted to retard the flow into the reservoir.

The objects and advantages above referred to are obtained by means of the apparatus illustrated in the accompanying drawings, in which—

Figure 2:
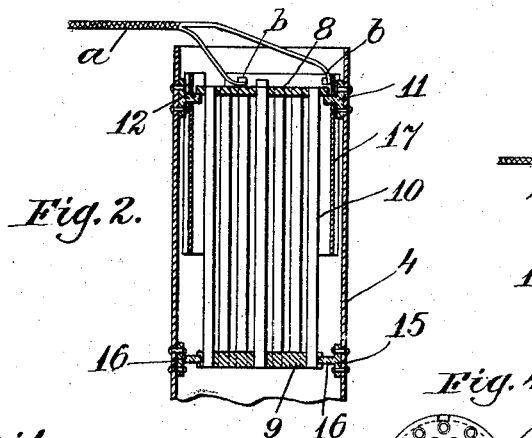
Figure 3:
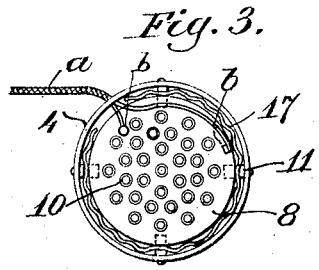

Figure 1 is a sectional diagram of an apparatus made in accordance with my invention, showing the inlet-pipe in side elevation. Fig. 2 is a central vertical section taken through a portion of the supply-pipe and through the electrolytic cell contained therein. Fig. 3 is a top plan view of Fig. 2, and Fig. 4 is a plan view of the bottom disk of the electrolytic cell.

Referring to the accompanying drawings for a more particular description of the invention, the numeral 1 designates a reservoir of any suitable size and having a concaved or inclined bottom 2 and a suitable covered manhole 3. Leading into the reservoir 1 is a supply-pipe 4, said pipe having a contracted inner end 5, which is preferably formed by means of a fitting extending substantially at right angles to the inlet-pipe 4 and having its discharge end disposed toward the upper wall of the reservoir. The purpose of this construction is to retard the water flowing into the pipe 4 in order that the water will be thoroughly electrified by means of an electrolytic cell 6, disposed within the pipe and extending across the entire sectional area of said pipe. At the intake end of the pipe 4 a screen 7 is suitably fitted in order that certain trashy foreign matter of an objectionable character will not be admitted to said pipe, and said intake end is also provided with a suitable valve $c$ for the purpose of cutting off the inflow of water from the source of supply.

Figure 4:
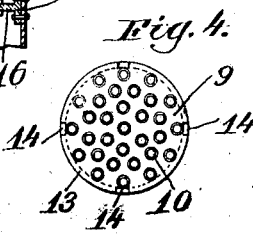

The electrolytic cell 6, as shown in Figs. 2, 3, and 4, comprises an upper disk 8 and a lower disk 9, of metal, and a series of small metal pipes 10, extending through said disks. The pipes 10 may be of considerable length and should be made to occupy as much of the transverse area of the pipe 4 as possible. The disk 8 is supported upon a series of glass insulators or brackets suitably secured to the inside of the pipe 4, each of said insulators being provided with an inwardly-extending lug or flange 12, upon which the disk 8 is supported. The lower disk 9 is provided with a peripheral groove 13 and a series of recesses 14, which extend from the groove through the upper surface of the disk. A series of glass insulators or brackets 15 are secured within the pipe 4, each provided with a flange or lug 16, constituting supports for the lower disk 9, the flange 16 being adapted to rest in the groove 13 and said disks and pipes being removable from the inlet-pipe 4 by bringing the flange 16 into register with the recesses 14 in the disk 9, as will be understood.

A corrugated cell-plate 17, bent into the form of a partial tube, with the ends slightly spaced apart, is suspended upon the flanges or lugs 12, slots or apertures being formed in said plate to engage said flanges or lugs. The terminals of the conductor-wires $a$ are connected to binding-posts $b$ on the battery-plate 17 and metallic disk 8. An electrolytic cell constructed as described may be quickly removed from the pipe 4 for the purpose of cleaning, repairs, and renewal.

In the lower end of the reservoir-bottom a pipe 18 for the purpose of cleaning the reservoir from the foreign matter 19 deposited therein by means of the electrolytic cell is provided with a suitable valve $19^\times$. Leading from a point above the inclined bottom of the reservoir is a pipe 21, provided with a screen 22 within the reservoir, said pipe having a valve 23 therein and a downwardly-extending branch 24, the lower end of which is connected to a filtering device. I have shown in the drawings two such filters and connecting-pipes and it will be understood that any suitable number may be utilized. However, the description of one filter will answer for all. The filter comprises a casing 25, in which at the top there is a layer of coarse sand 26 above a layer of coarse mineral wool 27. Below the wool 27 a quantity of fine sand 28 is placed, and below the fine sand a quantity of fine mineral wool 29 covers the bottom of the casing. A supply-pipe 30, provided with a suitable valve 31, communicates with the bottom of the filters and leads to the place for use through the pipe $21^\times$.

From the foregoing it will be understood that my apparatus is of comparatively simple construction, is inexpensive to instal and operate, and has been found an efficient and reliable apparatus for purifying and filtering water in large quantities.

Various changes in the form and proportion of the parts may be made without departing from the spirit and scope of my invention.

Having thus described my invention, what I desire to secure by Letters Patent and claim is—

1. In an apparatus of the character described, an inlet-pipe provided with an electrolytic cell, said cell comprising a series of longitudinally-extending pipes secured to disks at their ends, and a corrugated plate surrounding the pipes and disks, said disks being supported upon glass insulators, and electric connections for the plate and disk, respectively, substantially as described.

2. An inlet-pipe for water-purifiers having a contracted discharge end and containing an electrolytic cell composed of longitudinally-extending pipes, end disks and a corrugated plate surrounding the pipes, and electric connections for the plate and disk, respectively, substantially as described.

3. An inlet-pipe for water-purifiers, said pipe having secured to the interior surface thereof insulator supporting lugs or flanges, an electrolytic cell comprising end disks, longitudinal pipes extending through said disks and supported on said lugs or flanges, a corrugated cell-plate supported on the lugs or flanges, the lower disk being provided with a peripheral groove and recesses, a corrugated plate surrounding said pipes and disks, and electric connections for the plate and disks, respectively, substantially as described.

4. In an electric water purifying and filtering system, a reservoir, a filter, outlet-pipes leading from the reservoir to said filter, a service-pipe communicating with the filter, a cleaning-pipe at the bottom of the reservoir, and an inlet-pipe containing an electrolytic cell composed of longitudinally-extending pipes, end disks and a corrugated plate surrounding the pipes, and electric connections for the plate and disks respectively, all substantially as described.

5. In an electric water purifying and filtering system, a reservoir having a concaved bottom, a cleaning-pipe attached to the bottom of the reservoir and provided with a valve, outlet-pipes leading from the reservoir, filters connected to said pipes, a service-pipe leading from the bottom of the filters, and an inlet-pipe having a contracted discharge end and containing an electrolytic cell composed of longitudinally-extending pipes, end disks and a corrugated cell-plate surrounding the pipes, and electric connections for the plate and disks respectively, all substantially as described.

JACOB A. HYLE.

In presence of—
GEO. A. DO BYNE,
C. J. McCULLOUGH.